US012646057B2

(12) United States Patent
Upadhye

(10) Patent No.: US 12,646,057 B2
(45) Date of Patent: Jun. 2, 2026

(54) COMMUNICATIONS DEVICE, POINT OF SALE DEVICE, PAYMENT DEVICE AND METHODS

(71) Applicant: Vocalink International Limited, London (GB)

(72) Inventor: Nilesh Upadhye, London (GB)

(73) Assignee: Vocalink International Limited, London (GB)

( * ) Notice: Subject to any disclaimer, the term of this patent is extended or adjusted under 35 U.S.C. 154(b) by 109 days.

(21) Appl. No.: 18/541,281

(22) Filed: Dec. 15, 2023

(65) Prior Publication Data

US 2024/0127236 A1 Apr. 18, 2024

Related U.S. Application Data

(63) Continuation of application No. 16/313,789, filed as application No. PCT/GB2017/051902 on Jun. 29, 2017, now Pat. No. 11,847,641.

(30) Foreign Application Priority Data

Jun. 30, 2016 (GB) ...................................... 1611367

(51) Int. Cl.
| | |
|---|---|
| *G06Q 20/38* | (2012.01) |
| *G06Q 20/40* | (2012.01) |
| *H04L 9/08* | (2006.01) |

(52) U.S. Cl.
CPC ....... *G06Q 20/3829* (2013.01); *G06Q 20/401* (2013.01); *H04L 9/0869* (2013.01); *G06Q 2220/00* (2013.01); *H04L 2209/56* (2013.01)

(58) Field of Classification Search
CPC .............. H04L 9/0869; H04L 2209/56; G06Q 20/3829; G06Q 2220/00; G06Q 20/401
See application file for complete search history.

(56) References Cited

U.S. PATENT DOCUMENTS

| | | | | |
|---|---|---|---|---|
| 11,847,641 B2 * | 12/2023 | Upadhye | ............... | G07F 7/1008 |
| 2005/0177522 A1 | 8/2005 | Williams | | |

(Continued)

FOREIGN PATENT DOCUMENTS

| | | | | |
|---|---|---|---|---|
| EP | 2065856 A1 * | 6/2009 | ........... | G07F 7/1025 |
| EP | 3062271 A1 | 8/2016 | | |

OTHER PUBLICATIONS

Roongroj, Mobile Digital Right Management with enhanced security using limited-use session keys, 2015 12th International Conference on Electrical Engineering/Electronics, Computer, Telecommunications and Information Technology (ECTI-CON), 2015, p. 1-5.*

(Continued)

*Primary Examiner* — Ilse I Immanuel
(74) *Attorney, Agent, or Firm* — Pramudji Law Group PLLC; Ari Pramudji

(57) ABSTRACT

A communications device for implementing an electronic payment process, the communications device including a receiver unit operable to receive a secure limited use key (SLUK) from a financial institution that is generated by the financial institution using a first limited use key (LUK) generated using a first key associated with the financial institution, an identifier which identifies a user of the communications device, and a variable code, and a subset of the characters of a passcode associated with the user of the communications device, each character in the subset being identified by its character position in the passcode, and the character position in the passcode of each of the characters in the subset being determined by a predetermined algorithm on the basis of a second key associated with the user of the communications device, the identifier which identifies the user of the communications device and the variable code.

18 Claims, 8 Drawing Sheets

(56)                References Cited

U.S. PATENT DOCUMENTS

| | | | | |
|---|---|---|---|---|
| 2011/0208964 A1* | 8/2011 | Sama | .................... | H04L 9/3271 |
| | | | | 713/168 |
| 2013/0262317 A1 | 10/2013 | Collinge et al. | | |
| 2014/0169554 A1* | 6/2014 | Scarisbrick | .......... | H04L 9/0822 |
| | | | | 380/28 |
| 2015/0178724 A1* | 6/2015 | Ngo | .................... | G06Q 20/327 |
| | | | | 705/71 |
| 2016/0080381 A1* | 3/2016 | Hall | .................... | H04L 63/0884 |
| | | | | 726/7 |
| 2017/0155513 A1* | 6/2017 | Acar | ...................... | G06Q 20/20 |

OTHER PUBLICATIONS

Chokngamwong, Roongroj, "Mobile Digital Right Management with Enhanced Security Using Limited-Use Session Keys", 12th International Conference on Electrical Engineering/Electronics, Computer, Telecommunications and Information Technology (ECTI-CON), 2015, pp. 1-5.
PCT International Search Report and Written Opinion, Application No. PCT/GB2017/051902, dated Sep. 18, 2017, 17pp.
Menezes A J, et al., "Handbook of Applied Cryptography, Chapter 10: Identification and Entity Authentication", Handbook of Applied Cryptography, Jan. 1, 1997, pp. 385-440.
Slava Gomzin, "Chapter 7 Cryptography in Payments Applications", Hacking Point of Sale: Payment Application Secrets, Threats, and Solutions, Mar. 2, 2014, pp. 167-193.
Alain Hiltgen, et al., "Secure Internet Banking Authentication", Security & Privacy, IEEE Service Center, Mar. 1, 2006, pp. 24-32.
Neuman B C, et al., "Kerberos: an authentication service for computer networks", IEEE Communications Magazine, EEE Service Center, vol. 32, No. 9, Sep. 1, 1994, pp. 33-38.

* cited by examiner

| Row Number | | |
|---|---|---|
| 1 | User passcode length | 6 digits |
| 2 | Partial passcode length | 4 numbers out of 6 digits |
| 3 | User passcode. This is securely retained by the financial institution only and is known only to the user. The user passcode here is 831649. | 1 2 3 4 5 6 <br> 8 3 1 6 4 9 |
| 4 | Token PAN | 6666 6644 2202 3256 |
| 5 | Variable code (in DDDNN format) | 21501 |
| 6 | Partial passcode position numbers calculation <br><br> CRN= FPE (Secret Key, Token PAN + DDDNN) // FPE will be performed on PAN + DDDNN <br><br> CRN= FPE (Secret Key, 6666 6644 2204 4757) // FPE will be performed on PAN + DDDNN <br><br> CRN = 8966512455874501          //this cryptographic random number is generated <br><br>               //if this number is greater than 6 digits so no need regenerate <br><br>                 // does it contain unique four digits and which are less than or equal 6 number. <br><br>                    // unique numbers are 65124 <br><br> Partial Passcode Positions Number = GetFirstUniqueFourNumber(CRN) <br><br> Partial Passcode Positions Number = 6 5 1 2 <br><br> 1 2 3 4 5 6 <br> 8 3 1 6 4 9 <br><br> 6512 position numbers will be used by Issuing Bank to identify user's partial PIN to Secure LUK. In this case User's Partial Passcode is: 9483. | |

FIG. 6B

COMMUNICATIONS DEVICE, POINT OF SALE DEVICE, PAYMENT DEVICE AND METHODS

CROSS-REFERENCE TO RELATED APPLICATIONS

This patent application is a continuation of U.S. patent application Ser. No. 16/313,789, filed on Dec. 27, 2018, which is a National Stage Entry of PCT/GB2017/051902 filed on Jun. 29, 2017, and which claims the benefit and priority of Great Britain Patent Application No. 1611367.2 filed on Jun. 30, 2016. All of these applications are incorporated by reference herein in their entireties.

BACKGROUND

The present disclosure relates to a communications device, point of sale device, payment device, and methods.

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present disclosure.

Payment using mobile devices (such as mobile phones, tablet computers, etc., such devices also being known as communications devices) has huge potential to bring revolution in the payment industry. However it also brings security challenges. In particular, measures must be taken so as to reduce the risk of fraud or theft using such payment methods. This applies to all payments, but especially to high value payments (that is, payment values which exceed a predetermined threshold in a given currency).

One method of helping to improve mobile payment security is to require a user of a mobile device via which a payment is to be made to enter a passcode (such as a personal identification number (PIN) or password) in order to authenticate the payment. That is, in order for the payment to be completed, a user must be allocated or must choose a passcode in advance, and this passcode must then be entered by the user on the mobile device when that mobile device is used to initiate payment. The payment is then only completed in the case that the passcode is entered correctly. This helps to prevent fraudulent payment in the case that, for example, a user's mobile device is stolen.

In order to increase security further, it is known to require a user to enter only a subset of characters of their passcode for any given transaction. Thus, for example, if the user has a passcode with six characters, then the user may be asked to enter only four out of these six characters for a given transaction. The characters which must be entered by the user for a given transaction are identified by their position in the passcode, and different characters which must be entered may be chosen for each transaction. Thus, for example, in the case where the user has a six character passcode 831649, then for a first transaction, the user may be required to enter the $1^{st}$, $2^{nd}$, $4^{th}$ and $6^{th}$ characters as the passcode is read from left to right (thus requiring the user to enter the numerical characters 8, 3, 6 and 9 since these are, respectively, the $1^{st}$, $2^{nd}$, $4^{th}$ and $6^{th}$ characters of the passcode). Later on, in a second transaction, the user may be required to enter the $2^{nd}$, $3^{rd}$, $5^{th}$ and $6^{th}$ characters as the passcode is read from left to right (thus requiring the user to enter the numerical characters 3, 1, 4 and 9 since these are, respectively, the $2^{nd}$, $3^{rd}$, $5^{th}$, and $6^{th}$ characters of the passcode).

The position of the characters in the subset of characters which must be entered by the user to complete a transaction may be determined on a random (or at least pseudo-random) basis, for example.

By entering only a subset of the passcode characters (rather than all of the characters) in order to complete a transaction, security is increased. This is because even if someone else sees the user enter their passcode on a mobile device, this person not seen the whole passcode. This makes it more difficult for that someone to use the user's mobile device to initiate fraudulent payments, since the next time a transaction is attempted, it is likely that a different subset of characters of the passcode must be entered, and someone who has not seen the entire passcode will then not know what all characters in this new subset will be. For example, to use the examples of the first and second transactions mentioned above, if someone sees the user enter the $1^{st}$, $2^{nd}$, $4^{th}$ and $6^{th}$ passcode characters (these being 8, 3, 6 and 9, respectively), then if that someone then tries to fraudulently initiate a payment using the user's mobile device, then that fraudulent transaction will require the $2^{nd}$, $3^{rd}$, $5^{th}$ and $6^{th}$ passcode characters to be entered (these being 3, 1, 4 and 9). Even though this person saw the user enter the previous subset of characters during the first transaction, and thus may know the $1^{st}$, $2^{nd}$, $4^{th}$ and $6^{th}$ characters of the passcode, they still do not know the $3^{rd}$ or $5^{th}$ characters of the passcode. This fraudulent transaction thus cannot be completed. The subset of characters of a passcode which must be entered by a user in order to authorise a transaction may be referred to as a partial passcode.

Such a technique has a number of problems, however. In particular, there is the problem of how to determine which characters of a user's passcode should be used to generate the partial passcode for a given transaction. There is also the problem of keeping the passcode itself secure. Ideally, the passcode should only be stored by a financial institution associated with the user and should not be stored by a third party (for example, a provider of goods or services to the user) or on the user's mobile device. These security considerations must be taken into account whilst, at the same time, ensuring that the system is robust and efficient.

BRIEF DESCRIPTION

In a first aspect, the present disclosure provides a communications device for implementing an electronic payment process, the communications device including a receiver unit operable to receive a secure limited use key (SLUK) from a financial institution, the SLUK being generated by the financial institution using (1) a first limited use key (LUK) generated using a first key associated with the financial institution, an identifier which identifies a user of the communications device and a variable code and (2) a subset of the characters of a passcode associated with the user of the communications device, each character in the subset being identified by its character position in the passcode, and the character position in the passcode of each of the characters in the subset being determined by a predetermined algorithm on the basis of a second key associated with the user of the communications device, the identifier which identifies the user of the communications device, and the variable code, the second key being a secret key, wherein the SLUK is generated by wrapping the first LUK using each of the characters in the subset; and receive the variable code from the financial institution, and a storage unit operable to store the received SLUK and variable code and to store the second key associated with the user of the communications device and the identifier which identifies the user of the communications device; a controller operable to, in response to an operation by a user to initiate an electronic payment at a point of sale (POS) device, generate the character position in the passcode of each character in the subset, the character position in the passcode of each character in the subset being determined by the predetermined algorithm on the basis of the second key, the identifier of the user of the communications device and the variable code, as stored in the storage unit; and a user interface operable to indicate to the user of the communications device the character position in the passcode of each character in the subset as generated by the controller and to receive an input from the user indicative of each character in the subset, wherein the controller is operable to perform an unwrapping process on the SLUK stored in the storage unit using each character indicated by the input from the user, the unwrapping process generating a second LUK, and wherein the communications device includes a transmitter unit operable to transmit the generated second LUK to the financial institution for authentication of the electronic payment.

In an embodiment, the receiver unit is operable to receive a message indicative of a successful electronic payment in the case that the second LUK transmitted to the financial institution matches the first LUK generated by the financial institution and a message indicative of a non-successful electronic payment in the case that the second LUK transmitted to the financial institution does not match the first LUK generated by the financial institution.

In an embodiment, the predetermined algorithm for generating the character position in the passcode of each character in the subset includes the steps of (1) generating a cryptographic random number (CRN) by providing the second key, identifier of the user of the communications device, and variable code as inputs to a Format Preserving Encryption (FPE) function, (2) determining whether the generated CRN has a number of characters greater than or equal to the number of characters of the passcode associated with the user of the communications device, wherein if the generated CRN has a number of characters greater than or equal to the number of characters of the passcode, then the algorithm proceeds to step (3), and wherein if the generated CRN does not have a number of characters greater than or equal to the number of characters of the passcode, then the algorithm repeats step (2), (3) determining whether the generated CRN has at least a predetermined number of unique characters, each of which is less than or equal to the number of characters of the passcode, the predetermined number being the number of characters to be included in the subset of characters of the passcode, wherein if the number of unique characters each of which is less than or equal to the number of characters of the passcode is greater than or equal to the predetermined number, then the algorithm proceeds to step (4), and wherein if the number of unique characters, each of which is less than or equal to the number of characters of the passcode is less than the predetermined number, then the algorithm repeats step (2), and (4) determining a set of the identified unique characters each of which is less than or equal to the number of characters of the passcode, the set including a number of the identified unique characters equal to the predetermined number; wherein the identified unique characters in the set indicate the character position in the passcode of each character of the passcode to be included in the subset of characters of the passcode.

In an embodiment, the SLUK is generated by wrapping the first LUK using each of the characters in the subset of characters of the passcode using a Password-Based Key Derivation Function 2 (PBKDF2) algorithm, and the second LUK is generated using a corresponding PBKDF2 algorithm using each character indicated by the input from the user of the communications device.

In an embodiment, the first key associated with the financial institution is an Issuer Master Key (IMK).

In an embodiment, the second key associated with the user of the communications device is an Advanced Standards Encryption (AES) 128 bit secret key.

In an embodiment, the variable code has the format DDDNN, wherein DDD represents the number of days since a predetermined first day of the year and NN is a key sequence number ranging from 00 to 99.

In an embodiment, the identifier which identifies the user of the communications device is a Primary Account Number (PAN) associated with the user of the communications device.

In an embodiment, the second key associated with the user of the communications device is an Advanced Standards Encryption (AES) 128 bit secret key, the identifier which identifies the user of the communications device is a 16 character Primary Account Number (PAN) associated with the user of the communications device, and the variable code has the format DDDNN, wherein DDD represents the number of days since a predetermined first day of the year and NN is a key sequence number ranging from 00 to 99, and inputs to the FPE function for generating the CRN are the second key, and the inputs to the FPE function are the AES 128 bit secret second key and the sum of the 16 character PAN and variable code DDDNN.

In an embodiment, the second LUK is transmitted to the financial institution as a cryptogram.

In an embodiment, the controller is operable to generate a Key Check Value (KCV) using the second LUK, and the transmitter unit is operable to transmit the generated KCV to the financial institution together with the second LUK.

In an embodiment, the KCV is generated by an algorithm including the following steps: (1) providing the second LUK and eight zero bytes as inputs to an encryption function; and (2) obtaining the first three bytes of the output to the encryption function, the obtained first three bytes forming the KCV.

In an embodiment, following the operation by the user of the communications device to initiate an electronic payment at the POS device, the receiver is operable to receive a message from the POS device indicative of the payment value, and the controller is operable to determine whether or not the payment value exceeds a predetermined threshold, wherein the controller generates the character position in the passcode of each character in the subset, the user interface indicates to the user of the communications device the character position in the passcode of each character in the subset and is operable to receive the input from the user indicative of each character in the subset, the controller performs the unwrapping process on the SLUK using each character indicated by the input from the user to generate the second LUK, and the transmitter unit transmits the generated second LUK to the financial institution only when the payment value exceeds the predetermined threshold.

In an embodiment, the receiver unit and transmitter unit are operable to exchange signalling with the POS device using a Near Field Communication (NFC) interface and to exchange signalling with the financial institution using a longer range wireless access network (WAN) interface.

In an embodiment, the transmitter is operable to transmit the second LUK to the financial institution via the POS device.

In a second aspect, the present disclosure provides a payment device for implementing an electronic payment process at a financial institution, the payment device including a controller operable to generate a secure limited use key (SLUK) to be transmitted to a communications device, the SLUK being generated by the controller using (1) a first limited use key (LUK) generated using a first key associated with the financial institution, an identifier which identifies a user of the communications device and a variable code and (2) a subset of the characters of a passcode associated with the user of the communications device, each character in the subset being identified by its character position in the passcode and the character position in the passcode of each of the characters in the subset being determined by a predetermined algorithm on the basis of a second key associated with the user of the communications device, the identifier which identifies the user of the communications device and the variable code, the second key being a secret key, wherein the SLUK is generated by wrapping the first LUK using the each of the characters in the subset, a transmitter unit operable to transmit the generated SLUK to the communications device; and a receiver unit operable to receive a second LUK generated by the communications device, the second LUK being generated by the communications device in response to an operation by the user of the communications device to initiate an electronic payment at a point of sale (POS) device, and the generation of the second LUK including determining the character position in the passcode of each character in the subset, the character position in the passcode of each character in the subset being determined by the predetermined algorithm on the basis of the second key, the identifier of the user of the communications device and the variable code, each of which is known to the communications device, indicating to the user of the communications device the determined character position in the passcode of each character in the subset and receiving an input from the user indicative of each character in the subset, and performing an unwrapping process on the SLUK transmitted by the transmitter unit, the unwrapping process generating the second LUK, wherein the controller is operable to compare the received second LUK with the first LUK, and authenticate the electronic payment only when the second LUK matches the first LUK.

In an embodiment, the transmitter unit is operable to transmit a message indicative of a successful electronic payment in the case that the received second LUK matches the first LUK and a message indicative of a non-successful electronic payment in the case that the received second LUK the first LUK.

In an embodiment, in response to receipt of the second LUK, the controller is operable to regenerate the first LUK using the first key associated with the financial institution, the identifier which identifies the user of the communications device and the variable code.

In an embodiment, the predetermined algorithm for generating the character position in the passcode of each character in the subset includes the steps of (1) generating a cryptographic random number (CRN) by providing the second key, identifier of the user of the communications device, and variable code as inputs to a Format Preserving Encryption (FPE) function, (2) determining whether the generated CRN has a number of characters greater than or equal to the number of characters of the passcode associated with the user of the communications device, wherein if the generated CRN has a number of characters greater than or equal to the number of characters of the passcode, then the algorithm proceeds to step (3), and wherein if the generated CRN does not have a number of characters greater than or equal to the number of characters of the passcode, then the algorithm repeats step (2), (3) determining whether the generated CRN has at least a predetermined number of unique characters, each of which is less than or equal to the number of characters of the passcode, the predetermined number being the number of characters to be included in the subset of characters of the passcode, wherein if the number of unique characters, each of which is less than or equal to the number of characters of the passcode is greater than or equal to the predetermined number, then the algorithm proceeds to step (4), and wherein if the number of unique characters, each of which is less than or equal to the number of characters of the passcode is less than the predetermined number, then the algorithm repeats step (2), and (4) determining a set of the identified unique characters, each of which is less than or equal to the number of characters of the passcode, the set including a number of the identified unique characters equal to the predetermined number, wherein the identified unique characters in the set indicate the character position in the passcode of each character of the passcode to be included in the subset of characters of the passcode.

In an embodiment, the SLUK is generated by wrapping the first LUK using each of the characters in the subset of characters of the passcode using a Password-Based Key Derivation Function 2 (PBKDF2) algorithm, and the second LUK is generated using a corresponding PBKDF2 algorithm using each character indicated by the input from the user of the communications device.

In an embodiment, the first key associated with the financial institution is an Issuer Master Key (IMK).

In an embodiment, the second key associated with the user of the communications device is an Advanced Standards Encryption (AES) 128 bit secret key.

In an embodiment, the variable code has the format DDDNN, wherein DDD represents the number of days since a predetermined first day of the year, and NN is a key sequence number ranging from 00 to 99.

In an embodiment, the identifier which identifies the user of the communications device is a Primary Account Number (PAN) associated with the user of the communications device.

In an embodiment, the second key associated with the user of the communications device is an Advanced Standards Encryption (AES) 128 bit secret key, the identifier which identifies the user of the communications device is a 16 character Primary Account Number (PAN) associated with the user of the communications device, and the variable code has the format DDDNN, wherein DDD represents the number of days since a predetermined first day of the year and NN is a key sequence number ranging from 00 to 99, and inputs to the FPE function for generating the CRN are the second key, and the inputs to the FPE function are the AES 128 bit secret second key and the sum of the 16 character PAN and variable code DDDNN.

In an embodiment, the second LUK is received from the communications device as a cryptogram, and the controller is operable to generate a corresponding cryptogram from the first LUK and to compare the cryptograms, wherein if the cryptograms match, then the controller determines that the first LUK matches the second LUK, and if the cryptograms do not match, then the controller determines that the first LUK does not match the second LUK.

In an embodiment, the cryptogram is received together with a Key Check Value (KCV) generated by the communications device using the second LUK, and in the case that the second LUK does not match the first LUK, the controller is operable to generate a further KCV using the first LUK and to compare the received KCV with the further generated KCV, wherein if the received KCV matches the further generated KCV, then the controller determines that the characters of the subset of characters of the passcode were correctly input by the user of the communications device, and if the received KCV does not match the further generated KCV, then the controller determines that the characters of the subset of characters of the passcode were not correctly input by the user of the communications device.

In an embodiment, the further generated KCV is generated by an algorithm including the following steps: (1) providing the first LUK and eight zero bytes as inputs to an encryption function, and (2) obtaining the first three bytes of the output to the encryption function, the obtained first three bytes forming the further generated KCV.

In an embodiment, the receiver is operable to receive the second LUK from the communications device via the POS device.

In a third aspect, the present disclosure provides a point of sale (POS) device for implementing an electronic payment process, the POS device including a controller operable to determine a payment value of a payment to be made by a user of a communications device, a receiver operable to receive, from the communications device, a limited use key (LUK), the LUK being generated by the communications device and the generation of the LUK including determining a character position in a passcode associated with the user of the communications device of each character in a subset of characters of the passcode, the character position in the passcode of each character in the subset being determined by a predetermined algorithm on the basis of a secret key associated with the communications device, an identifier of the user of the communications device and a variable code, each of which is known to the communications device, indicating to the user of the communications device the determined character position in the passcode of each character in the subset and receiving an input from the user indicative of each character in the subset, and performing an unwrapping process on the SLUK transmitted by the transmitter, the unwrapping process generating the LUK, and a transmitter operable to transmit the determined payment value and the LUK received from the communications device to a financial institution.

In an embodiment, prior to receiving the LUK from the communications device, the receiver is operable to receive signalling from the communications device indicative of an initiation of an electronic payment, and, in response, the controller is operable to control the transmitter to transmit signalling indicative of the payment value to the communications device.

In a fourth aspect, the present disclosure provides a method of operating a communications device for implementing an electronic payment process, the method including controlling a receiver unit of the communications device to receive a secure limited use key (SLUK) from a financial institution, the SLUK being generated by the financial institution using (1) a first limited use key (LUK) generated using a first key associated with the financial institution, an identifier which identifies a user of the communications device and a variable code and (2) a subset of the characters of a passcode associated with the user of the communications device, each character in the subset being identified by its character position in the passcode and the character position in the passcode of each of the characters in the subset being determined by a predetermined algorithm on the basis of a second key associated with the user of the communications device, the identifier which identifies the user of the communications device and the variable code, the second key being a secret key, wherein the SLUK is generated by wrapping the first LUK using each of the characters in the subset, and receive the variable code from the financial institution, controlling a storage unit of the communications device to store the received SLUK and variable code and to store the second key associated with the user of the communications device and the identifier which identifies the user of the communications device, in response to an operation by a user to initiate an electronic payment at a point of sale (POS) device, generate the character position in the passcode of each character in the subset, the character position in the passcode of each character in the subset being determined by the predetermined algorithm on the basis of the second key, the identifier of the user of the communications device and the variable code, as stored in the storage unit, and controlling a user interface of the communications device to indicate to the user of the communications device the character position in the passcode of each character in the subset as generated by the controller and to receive an input from the user indicative of each character in the subset; wherein an unwrapping process is performed on the SLUK stored in the storage unit using each character indicated by the input from the user, the unwrapping process generating a second LUK, and wherein the method includes controlling a transmitter unit of the communications device to transmit the generated second LUK to the financial institution for authentication of the electronic payment.

In a fifth aspect, the present disclosure provides a recording medium storing a computer program for controlling a computer to perform a method according to the fourth aspect.

In a sixth aspect, the present disclosure provides a method of operating a payment device for implementing an electronic payment process at a financial institution, the method including generating a secure limited use key (SLUK) to be transmitted to a communications device, the SLUK being generated by the controller using (1) a first limited use key (LUK) generated using a first key associated with the financial institution, an identifier which identifies a user of the communications device and a variable code and (2) a subset of the characters of a passcode associated with the user of the communications device, each character in the subset being identified by its character position in the passcode and the character position in the passcode of each of the characters in the subset being determined by a predetermined algorithm on the basis of a second key associated with the user of the communications device, the identifier which identifies the user of the communications device and the variable code, the second key being a secret key, wherein the SLUK is generated by wrapping the first LUK using the each of the characters in the subset, controlling a transmitter unit of the payment device to transmit the generated SLUK to the communications device; and controlling a receiver unit of the payment device to receive a second LUK generated by the communications device, the second LUK being generated by the communications device in response to an operation by the user of the communications device to initiate an electronic payment at a point of sale (POS) device, and the generation of the second LUK including determining the character position in the passcode of each character in the subset, the character position in the passcode of each character in the subset being determined by the predetermined algorithm on the basis of the second key, the identifier of the user of the communications device and the variable code, each of which is known to the communications device; indicating to the user of the communications device the determined character position in the passcode of each character in the subset and receiving an input from the user indicative of each character in the subset; and performing an unwrapping process on the SLUK transmitted by the transmitter unit, the unwrapping process generating the second LUK, wherein the received second LUK is compared with the first LUK, and the electronic payment is authenticated only when the second LUK matches the first LUK.

In a seventh aspect, the present disclosure provides a recording medium storing a computer program for controlling a computer to perform a method according to the sixth aspect.

In an eighth aspect, the present disclosure provides a method of operating a point of sale (POS) device for implementing an electronic payment process, the method including determining a payment value of a payment to be made by a user of a communications device, controlling a receiver of the POS device to receive, from the communications device, a limited use key (LUK), the LUK being generated by the communications device and the generation of the LUK including determining a character position in a passcode associated with the user of the communications device of each character in a subset of characters of the passcode, the character position in the passcode of each character in the subset being determined by a predetermined algorithm on the basis of a secret key associated with the communications device, an identifier of the user of the communications device and a variable code, each of which is known to the communications device, indicating to the user of the communications device the determined character position in the passcode of each character in the subset and receiving an input from the user indicative of each character in the subset, and performing an unwrapping process on the SLUK transmitted by the transmitter, the unwrapping process generating the LUK, and controlling a transmitter of the POS device to transmit the determined payment value and the LUK received from the communications device to a financial institution.

In a ninth aspect, the present disclosure provides a recording medium storing a computer program for controlling a computer to perform a method according to the eighth aspect.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 6A-B schematically show a process used for identifying the characters of a partial passcode, according to an embodiment of the present disclosure;

DESCRIPTION OF THE EMBODIMENTS

Figure 1:
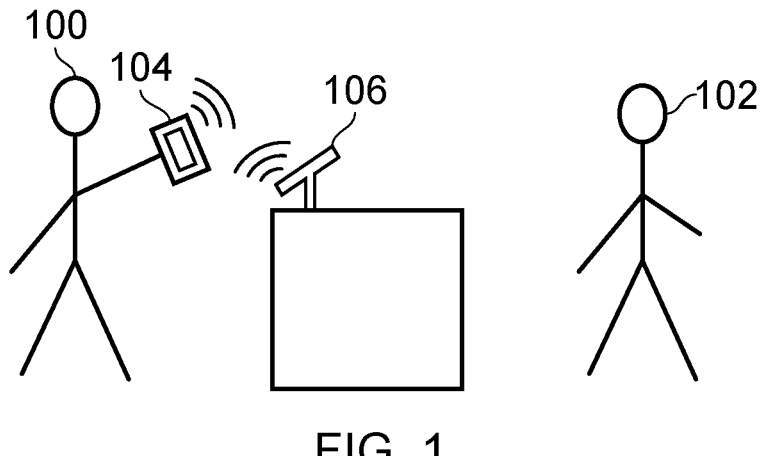
FIG. 1 schematically shows a mobile device payment arrangement implemented when a user wishes to buy a product from a store, according to an embodiment of the present disclosure.

Referring now to the drawings, wherein like reference numerals designate identical or corresponding parts throughout the several views.

FIG. 1 schematically shows a mobile device payment arrangement implemented when a user 100 wishes to buy a product from a store. When wishing to pay for the product, the staff member 102 of the store puts the product through the store's check out or payment system in the usual way. In this case, the staff member 102 will scan the product using a barcode or the like and a suitable electronic check out system (as known in the art). The store is set up to allow mobile device payments (also known as mobile payments). In particular, the store is fitted with a point of sale (POS) device 106 which is able to exchange signalling with a mobile device 104 (also known as a communications device) of the user so as to enable the mobile payment to take place. In this example, signalling is exchanged between the communications device 104 and POS device 106 using Near Field Communication (NFC) technology, although it will be appreciated that any other suitable signalling technology (such as Bluetooth, Wi-Fi, cellular signalling) could also be used. When NFC is used, the user 100 simply has to bring the communications device 104 into close proximity with the POS device (the close proximity being determined by one or more of the relevant NFC standards, as known in the art) in order to initiate the implementation of an electronic payment process.

Figure 2C:
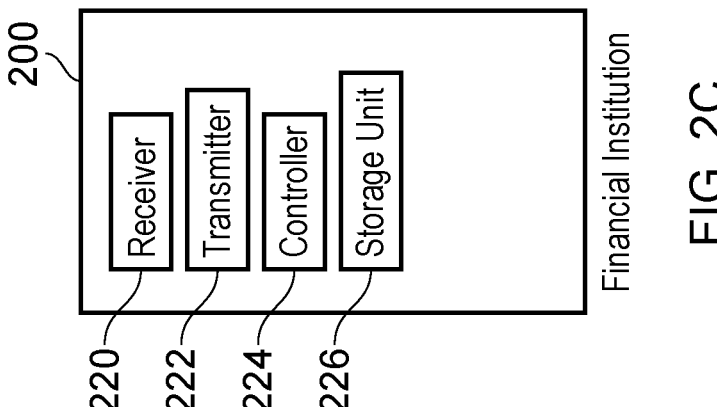
FIGS. 2A-C schematically show a communications device, point of sale (POS) device and payment device according to embodiments.
Figure 2B:
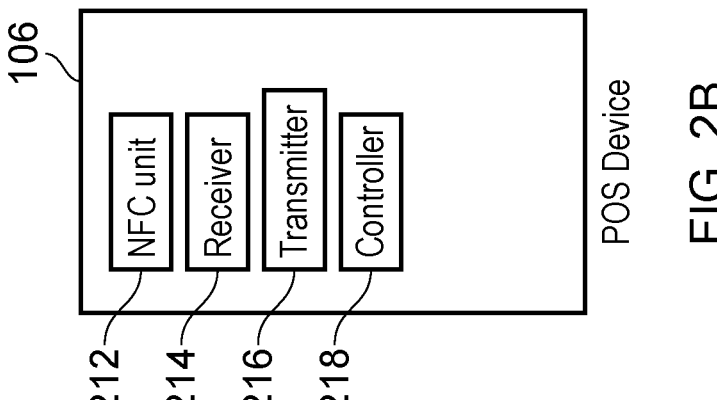
Figure 2A:
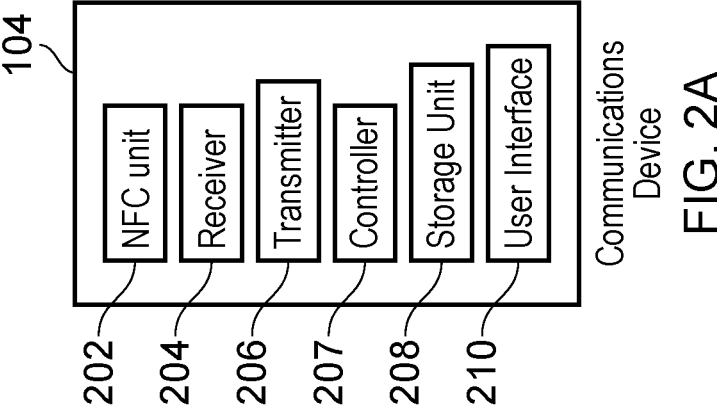

The electronic payment process is carried out using the communications device 104, POS device 106, and a payment device 200. These are illustrated in FIGS. 2A, 2B, and 2C, respectively. In this example, the communications device 104 belongs to the user 100, the POS device 106 is located at the store, and the payment device 200 is located at a financial institution associated with the user. The financial institution associated with the user is a financial institution through which a user may transfer funds so as to issue payment to a third party (such as the store at which the user buys the product). For example, the financial institution may be a bank at which the user has a bank account.

As shown in FIG. 2A, the communications device 104 includes an NFC unit 202, receiver 204, transmitter 206, controller 207, storage unit 208, and user interface 210. The communications device may be, for example, a mobile phone, tablet computer, or any other suitable device including the components as exemplified in FIG. 2A. The NFC unit 202 includes an NFC receiver and NFC transmitter so as to allow the communications device to receive and transmit NFC signals with another NFC enabled device (such as POS device 106). The receiver 204 and transmitter 206 allow the communications device 104 to receive and transmit, respectively, signals from external devices using a suitable interface such as a wide area network (WAN) interface (for example, a cellular interface such as Long Term Evolution (LTE) or Universal Mobile Telecommunications System (UMTS) or a Wi-Fi interface). The storage unit 208 allows data to be stored by the communications device 104. The user interface 210 allows a user to interact with the communications device 104 by viewing information output by the communications device and inputting information to the communications device. For example, the user interface may be touch screen or may include a screen and one or more physical buttons or switches or the like. The controller 207 controls the operation of each of the other components of the communications device.

As shown in FIG. 2B, the POS device 106 includes an NFC unit 212, a receiver 214, transmitter 216, and a controller 218. The NFC unit 212 includes an NFC receiver and NFC transmitter so as to allow the POS device to receive and transmit NFC signals with another NFC enabled device (such as communications device 104). The receiver 204 and transmitter 206 allow the POS device to receive and transmit, respectively, signals from external devices using a suitable interface such as a WAN interface (for example, a cellular interface such as Long Term Evolution (LTE) or Universal Mobile Telecommunications System (UMTS) or a Wi-Fi interface) or wired access interface (such as a wired Ethernet interface). The controller 218 controls the operation of each of the other components of the POS device.

As shown in FIG. 2C, payment device 200 located at the financial institution associated with the user 100 of the communications device 104 includes a receiver 220, transmitter 222, controller 224, and storage unit 226. The receiver 220 and transmitter 222 allow the payment device 200 to receive and transmit, respectively, signals from external devices using a suitable interface such as a WAN interface (for example, a cellular interface such as Long Term Evolution (LTE) or Universal Mobile Telecommunications System (UMTS) or a Wi-Fi interface). The storage unit 226 allows data to be stored by the payment device 200. The controller 224 controls the operation of each of the other components of the payment device 200.

The operation and interaction of each of the communications device 104, POS device 106, and payment device 200 is discussed in detail below. As previously discussed, in embodiments of the present disclosure, in order to authenticate a payment in the situation as exemplified in FIG. 1, a user must enter a partial passcode using the communications device 104. The partial passcode is defined by a subset of characters of a passcode which has previously been associated with the user, and the subset of characters which define the partial passcode is determined for each individual transaction which takes place. More specifically, for each transaction (for example, each time the user 100 wishes to make a payment for a product at a store), the position in the passcode of each character in the subset is determined, and the user is then required to enter the characters of the passcode which occur at those determined positions. The transaction (for example, the payment to the store) will only be completed if the characters of the partial passcode are correctly entered.

In one embodiment, the user is presented with a partial passcode entry screen 300 on the communications device 104. The partial passcode entry screen 300 is displayed on a screen of the communications device following a successful exchange of NFC signalling between the communications device 104 and POS device 106 which occurs when the user attempts to pay for a product or service using the communications device 104. Thus, for example, the staff member 102 at a store checks though the one or more products or services to be purchased by the user 100, and once the total required payment value has been calculated, the user 100 is given the option of initiating a mobile payment using the communications device 104 and POS device 106. In this case, the user brings the communications device 104 into sufficient proximity to the POS device 106 so as to allow an exchange of NFC signalling between the communications device and POS device, thus initiating a mobile payment process.

Figure 3:
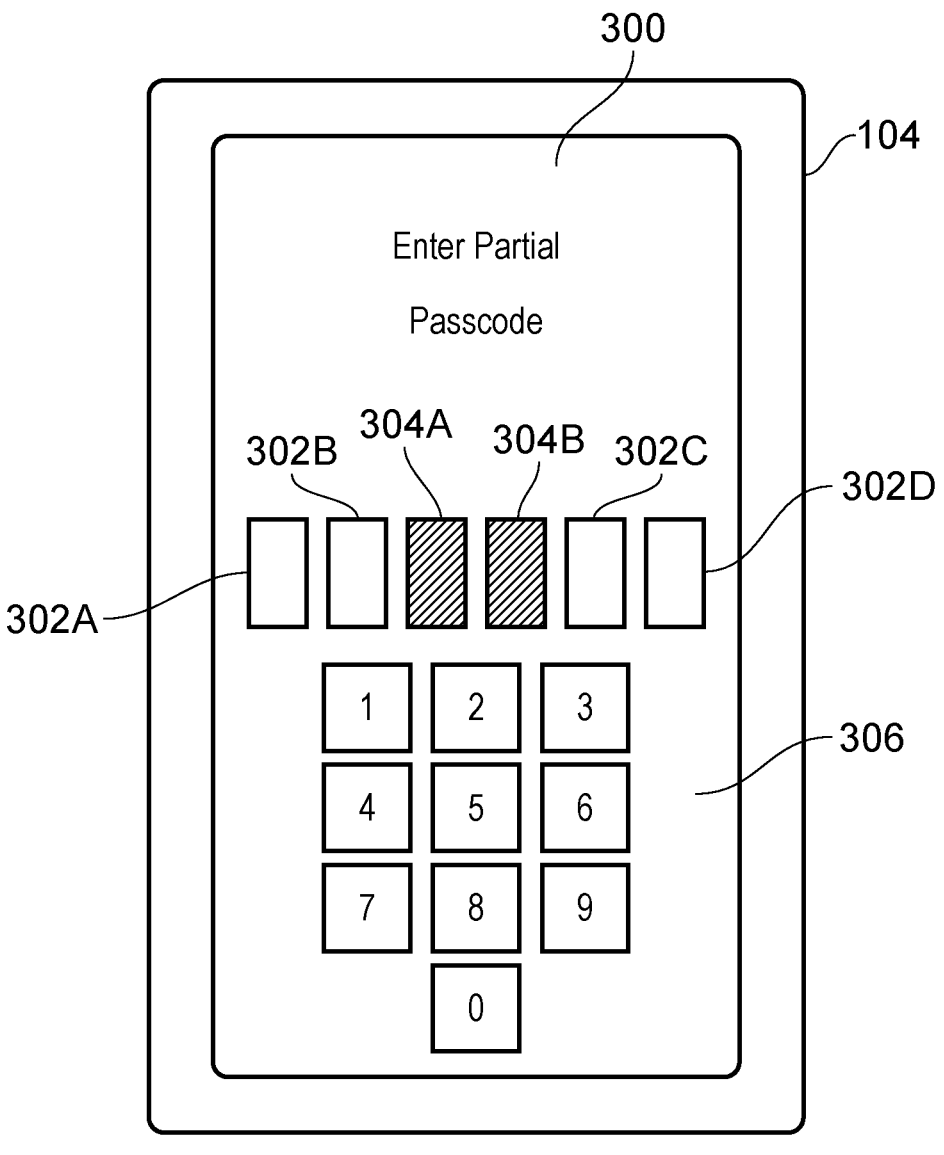
FIG. 3 schematically shows a partial passcode entry screen which is presented to a user, according to an embodiment of the present disclosure.

In the example of FIG. 3, the partial passcode has been generated such that the user must enter the $1^{st}$, $2^{nd}$, $5^{th}$, and $6^{th}$ characters of the six character passcode. The $1^{st}$, $2^{nd}$, $5^{th}$, and $6^{th}$ characters form a subset of characters of the passcode, and the characters in the subset represent the partial passcode. These characters must be entered in the accessible passcode character entry fields 302A-D. Thus, to take again the earlier example passcode of "831649", the user 100 must enter the number "8" (this being the $1^{st}$ character) in field 302A, the number "3" (this being the $2^{nd}$ character) in the field 302B, the number "4" (this being the $5^{th}$ character) in the field 302C and the number "9" (this being the $6^{th}$ character) in the field 302D. The remaining passcode character entry fields 304A and 304B (which relate to the $3^{rd}$ character "1" and the $4^{th}$ character "6", respectively, of the passcode "831649") appear shaded and are not accessible by the user. The user thus does not need to enter the $3^{rd}$ and $4^{th}$ characters of the passcode.

The user is thus able to recognise which characters of the passcode are required based on the accessible and non-accessible fields and the fact that each of the fields as considered from left to right corresponds to the position of a respective character of the passcode as read from left to right. That is, because the $1^{st}$, $2^{nd}$, $5^{th}$, and $6^{th}$ fields are accessible, the user knows that it is the $1^{st}$, $2^{nd}$, $5^{th}$, and $6^{th}$ characters of the passcode which must be respectively entered in these fields. The user also knows that, because the $3^{rd}$ and $4^{th}$ fields are not accessible, the $3^{rd}$ and $4^{th}$ characters of the passcode are not required for this particular transaction. As previously mentioned, for a different transaction, the positions in the passcode of the characters to be included in the partial passcode may be different.

Only if the required passcode characters are correctly entered by the user 100 at the partial passcode entry screen is the transaction allowed to be completed. In this example, the user interface 210 of the communications device 104 is a touch screen and the user is able to enter the passcode character associated with each accessible field 302A-D using the virtual numerical keypad 306.

It is noted that the partial passcode entry screen 300 is only an example, and the passcode screen may take any other suitable format. For example, the partial passcode entry screen may instead include a plurality of successively displayed sub-screens in which the user is invited to enter one of the characters of the partial passcode on each sub-screen. Thus, for example, when it is the $1^{st}$, $2^{nd}$, $5^{th}$, and $6^{th}$ characters of the passcode which must be entered, one respective sub-screen will be displayed to allow entry of each of these characters. Each sub-screen may look the same and have the same functionality as the partial passcode entry screen 300 shown in FIG. 3, the difference being that only a single field (rather than multiple fields 302A-D, for example) is displayed for allowing entry of the single one of the characters associated with that sub-screen via the virtual numerical keypad 306. It is noted that the order in which the characters of the passcode are entered need not necessarily be correlated with the order in which the characters are positioned in the passcode. For example, although it may be the case that the $1^{st}$, $2^{nd}$, $5^{th}$, and $6^{th}$ characters are respectively entered via the first, second, third and fourth successively displayed sub-screen (so that the $1^{st}$ character is entered, followed by the $2^{nd}$ character, followed by the $5^{th}$ character, followed by the $6^{th}$ character), this is not necessary. For example, the first displayed sub-screen may be associated with the $2^{nd}$ character, the second displayed sub-screen may be associated with the $5^{th}$ character, the third displayed sub-screen may be associated with the $1^{st}$ character and the fourth displayed sub-screen may be associated with the $6^{th}$ character (so that the $2^{nd}$ character is entered, followed by the $5^{th}$ character, followed by the $1^{st}$ character, followed by the $6^{th}$ character). The order in which the characters of the partial passcode are entered can thus be changed as well as the characters of the partial passcode itself.

The way in which the characters which define the partial passcode are determined and in which a payment is authenticated using the partial passcode will now be described in detail.

Figure 4:
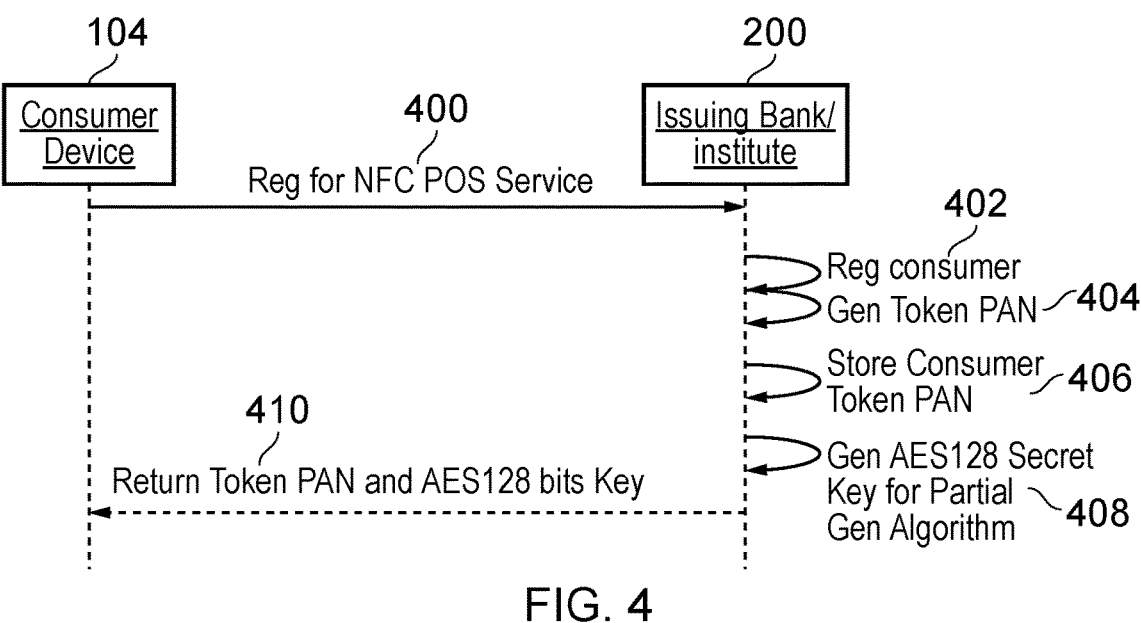
FIG. 4 schematically shows a registration process, according to an embodiment of the present disclosure.

In order to use the mobile payment arrangement according to embodiments of the present disclosure, the user must first register their communications device 104. The process of this registration is schematically illustrated in FIG. 4.

Firstly, at step 400, the transmitter 206 of the communications device 104 transmits a registration request to the payment device 200 at the financial institution associated with the user of the communications device. The registration request is received by the receiver 220 of the payment device 200. The controller 224 of the payment device then registers the user for use with the mobile payment service at step 402 and, at step 404, generates a token primary account number (PAN) associated with the user. The generated token PAN is a number which acts as an identifier of the user and which is used in the generation of subsequent cryptographic keys, as will be explained. The token PAN associated with the user is then stored in the storage unit 226 of the payment device at step 406. At step 408, a secret key which is associated with the user is generated. The secret key may be an Advanced Standards Encryption (AES) 128 bit key, for example. The secret key is also stored in the storage unit 226 (and is protected using, for example, a cryptographic hardware security module). At step 410, the transmitter 222 transmits the generated token PAN and secret key back to the receiver 204 of the communications device 104. The token PAN and secret key are then stored in the storage unit 208 of the communications device 104 (the secret key being protected using, for example, a whitebox cryptographic technique). This completes the registration process of the communications device, and allows the user to now initiate mobile payments using the communications device.

Figure 5:
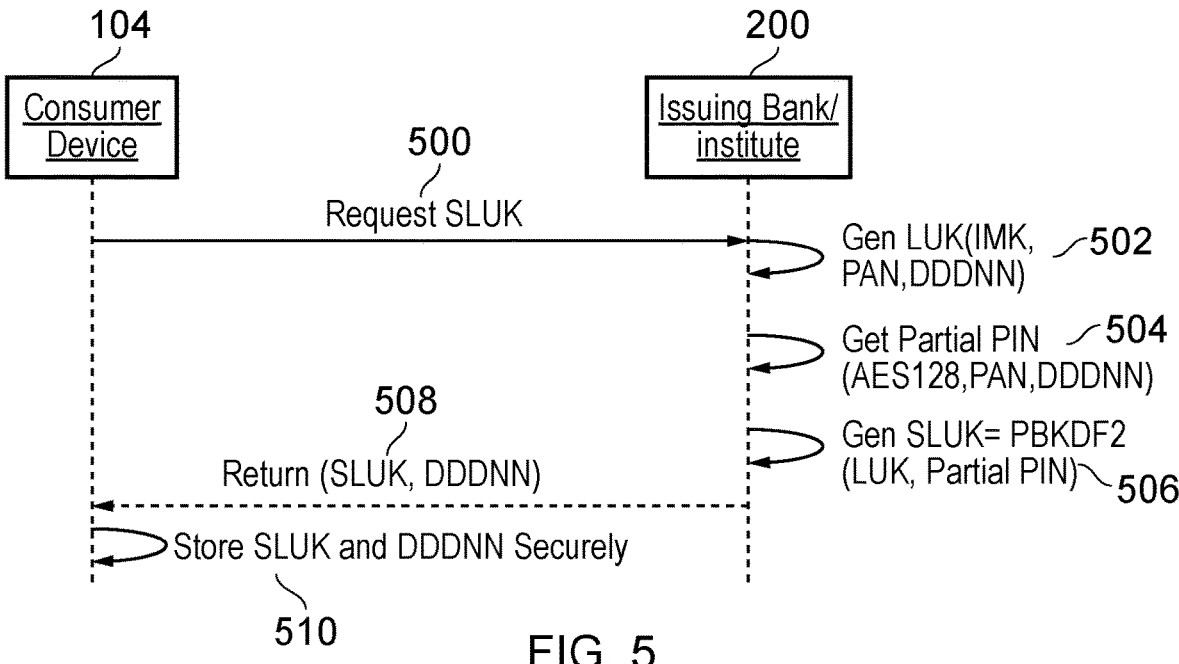
FIG. 5 schematically shows a process in which a secure limited use key (SLUK) is generated and transmitted to a communications device, according to an embodiment of the present disclosure.

Once registered, and prior to initiating a payment at the POS device 106, the communications device 104 must first be provided with secure limited use key (SLUK) for use during the payment process. The SLUK is a cryptographic key, and the generation of the SLUK and its transmission to the communications device from the payment device 200 is schematically illustrated in FIG. 5.

Firstly, at step 500, the transmitter 206 of the communications device 104 transmits a SLUK request to the payment device 200. The SLUK request is received by the receiver 220 of the payment device. The SLUK request indicates to the payment device that the communications device requires a SLUK.

At step 502, the controller 224 of the payment device 200 first generates a limited use key (LUK). This is a cryptographic key, and is generated via any suitable key derivation function using the token PAN associated with the user of the communications device, a further key associated with the financial institution to which the payment device 200 is related, and a variable code. The key generation function may be, for example, a suitable symmetric key derivation function (such as, for example, a function based on an Advanced Encryption Standard (AES) or Data Encryption Standard (DES) technique). The variable code is discussed in more detail below. The key associated with the financial institution to which the payment device 200 is related is stored in the storage unit 226 of the payment device 200, and may be an Issue Master Key (IMK), for example.

At step 504, the controller 224 generates the position in the passcode of each of the characters of the passcode which are to form the subset of characters defining the partial passcode. The determined characters are then acquired from the passcode (which is stored in the storage unit 226 of the payment device 200 following previous allocation of a passcode to the user), and, at step 506, the LUK generated in step 502 is wrapped using the characters of the partial passcode so as to generated the SLUK. This wrapping may be carried out using a Password-Based Key Derivation Function 2 (PBKDF2) algorithm, for example. At step 508, the transmitter 222 of the payment device 200 then transmits the SLUK to the receiver 204 of the communications device 104. The SLUK is then stored in the storage unit 208 of the communications device 104 at step 510. This process is described in more detail below.

Figure 6A:
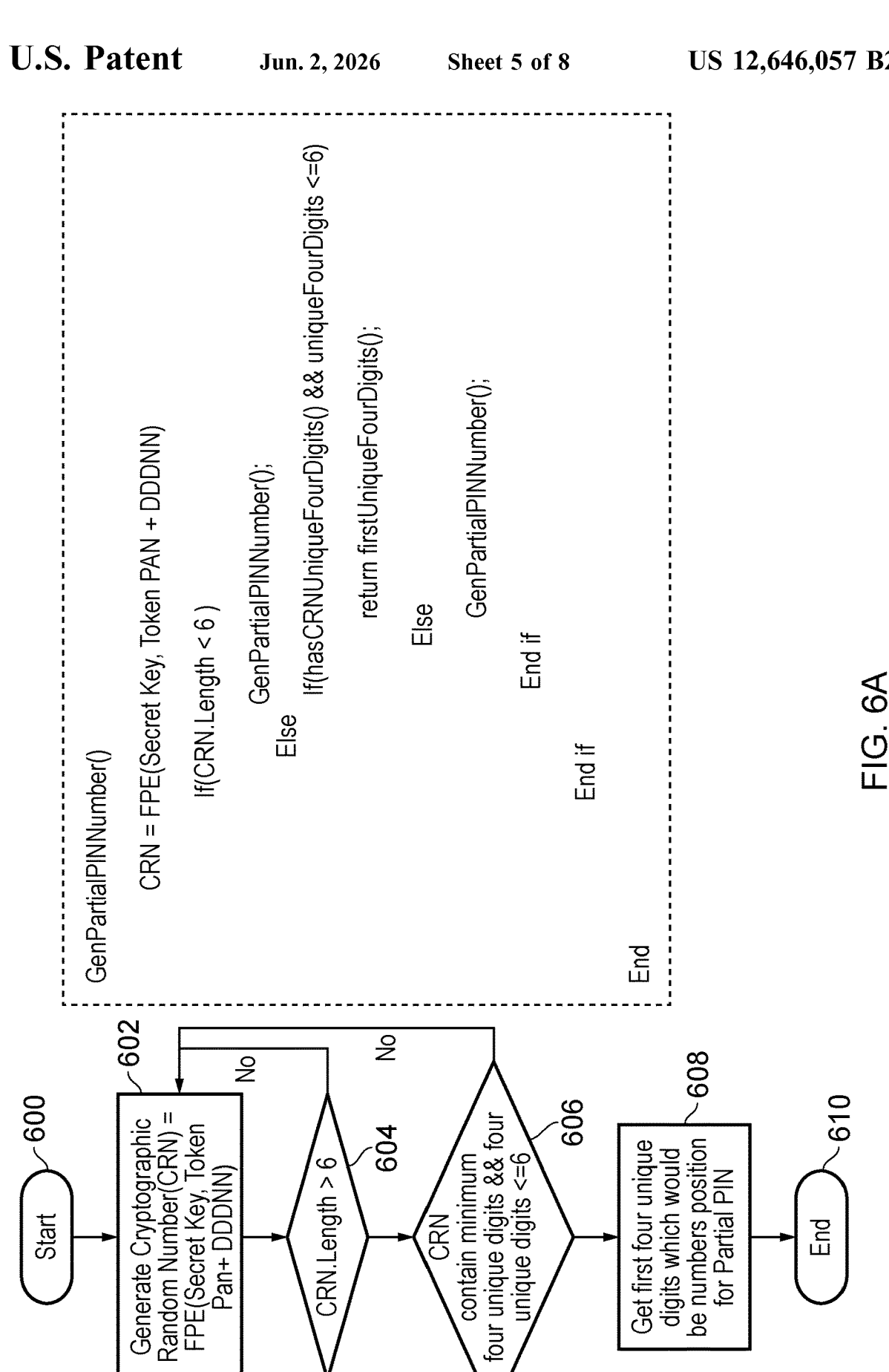

The process of determining the position in the passcode of each of the characters of the passcode which are to form the subset of characters defining the partial passcode is schematically illustrated in FIGS. 6A and 6B.

The process starts at step 600. At step 602, a cryptographic random number (CRN) is generated on the basis of the secret key associated with the user, the token PAN associated with the user and a further code. The further code varies according to one or more predetermined rules, and may be referred to as a variable code. In this example, the variable code has the format DDDNN, wherein DDD represents the number of days since 1 January of the current year (so that for 1 January, DDD=000, for 2 January, DDD=001, and so on) and NN is a key sequence number ranging from 00-99. The key sequence number NN may be generated using, for example, a random number generator or, alternatively, the controller 224 may increment the value of the key sequence number NN each time a SLUK is request by a communications device 104 (in this case, if more than 100 SLUKs are requested on a given day, then the key sequence number NN will cycle round again so that the variable code used for the generation of the 101th SLUK will once again have NN=00). It will be appreciated that the variable code may be generated with any other suitable format and using any other predetermined rule(s), as long as the resulting variable code is suitable for use in generation of the CRN. It is noted that this same variable code is used in the generation of the LUK generated in step 502. The CRN may be generated on the basis of the secret key, token PAN and variable code using Format Preserving Encryption (FPE), for example.

An example of the generation of the CRN is shown in FIG. 6B. The user's token PAN is shown in row (4) and the variable code (in the format DDDNN) is shown in row (5). As shown in row (6), the CRN is generated by applying an FPE encryption function with the user's secret key, token PAN and variable code as inputs. In particular, the token PAN and variable code are added together and the resulting total is input to an FPE encryption function together with the user's secret key. The result is show in row (6).

At step 604, it is determined as to whether the generated CRN has a length greater than 6. If the generated CRN does not have a length greater than 6, then the process returns to step 602, and the CRN is regenerated. This regeneration uses FPE in the same way as previously described. On the other hand, if the generated CRN does have a length greater than 6, then the process proceeds to step 606. It can be seen in row (6) of FIG. 6B that the CRN does have a length greater than 6 digits, and thus there is no need to regenerate the CRN. The process thus proceeds to step 606. The check at step 604 to determine whether the generated CRN has a length greater than the length of the passcode (in this case, a length greater than 6) helps improve the chance that the CRN which is passed to step 606 of the process has a sufficient number of unique bits each of which has a value less than or equal to the length of the passcode (see below).

At step 606, it is determined as to whether the CRN has at least 4 unique digits each of which has a numerical value which is less than or equal to 6. If this condition is not satisfied, then the process returns to step 602, and the CRN is regenerated. On the other hand, if this condition is satisfied, then the process proceeds to step 608. It can be seen in row (6) of FIG. 6B that the generated CRN has 5 unique digits each of which has a numerical value less than or equal to 6. These numbers are 6, 5, 1, 2, and 4.

At step 608, the first four of the at least four unique digits each of which has a numerical value which is less than or equal to 6, as identified in step 606, are identified. These then identify the position in the passcode of each of the passcode characters which are to form the subset of characters which define the partial passcode. Thus, looking at the list of numbers 65124 generated in step 606, the first four of these numbers gives the list 6512. Thus, the characters of the passcode which define the partial passcode are the $6^{th}$ character, $5^{th}$ character, $1^{st}$ character, and $2^{nd}$ character. As shown in row (3) of FIG. 6B, the passcode of the user is 831649. Thus, the numbers defining the partial passcode are 9 (the $6^{th}$ character), 4 (the $5^{th}$ character), 8 (the $1^{st}$ character), and 3 (the $2^{nd}$ character). It will be appreciated that, when necessary, these numbers may be entered by the user using, for example, the partial passcode entry screen shown in FIG. 3 (since the accessible fields 302A-D relate to the $6^{th}$, $5^{th}$, $1^{st}$, and $2^{nd}$ characters of the passcode).

Once the positions of the characters defining the partial passcode have been identified, the process ends at step 610.

The passcode of the user is saved in the storage unit 226 of the payment device 200. Thus, following the determination of the positions of the characters of the partial passcode, the controller 224 retrieves the appropriate characters of the passcode from the storage unit (thus, in the above example, the controller 224 would retrieve the characters 9, 4, 8, and 3). The determination of the positions of the characters of the partial passcode (using the method exemplified with reference to FIGS. 6A and 6B) and the retrieving of these characters occurs in step 504. The characters of the partial passcode are then used to wrap the LUK in step 506 using, for example, a PBKDF2 encryption algorithm, as previously explained. The resulting SLUK is then transmitted to the communications device 104, together with the variable code, at step 508, and the SLUK and variable code are stored in the storage unit 208 of the communications device at step 510.

Figure 7:
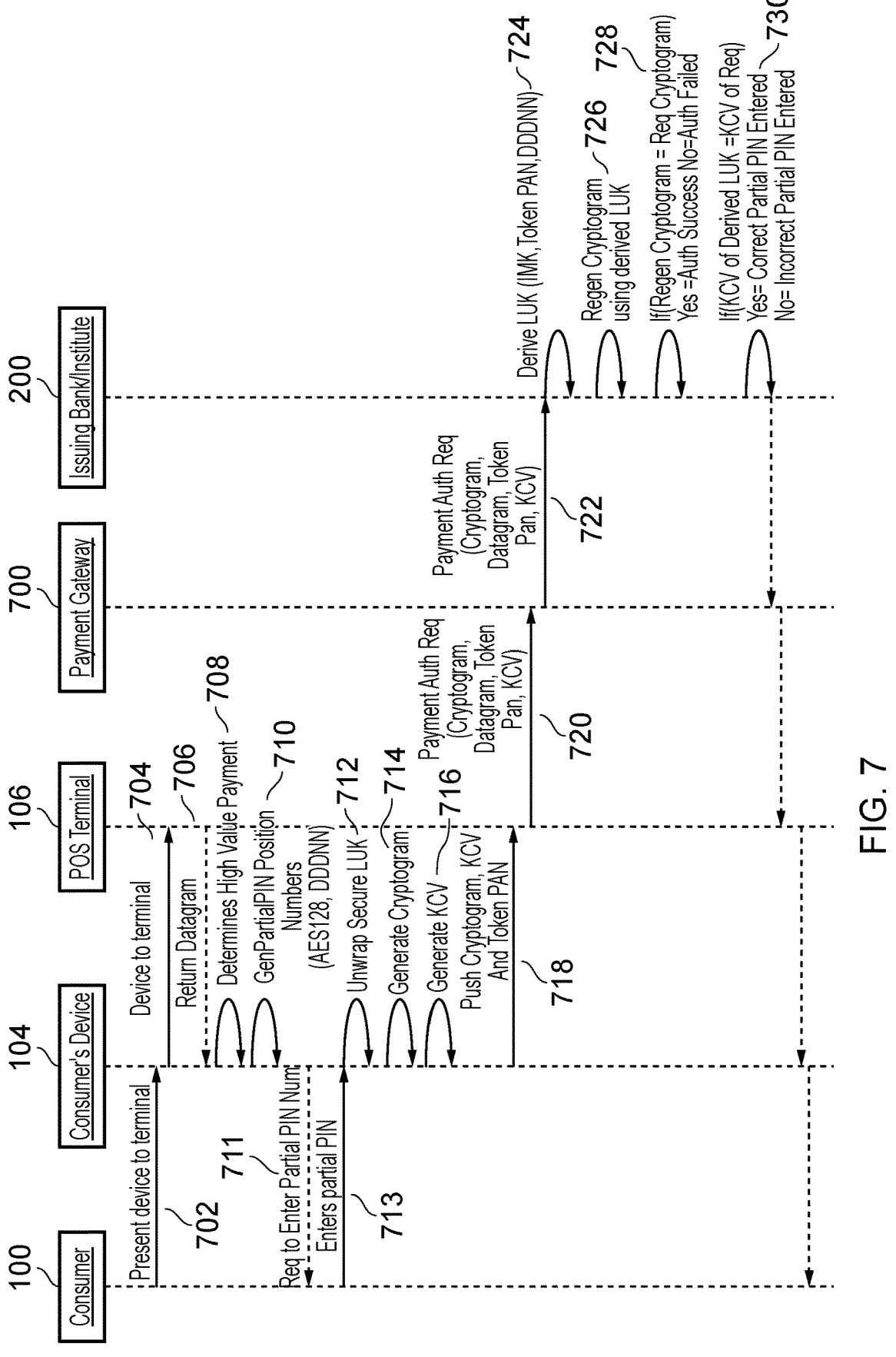
FIG. 7 schematically shows an electronic payment process, according to an embodiment of the present disclosure.

Following the storage of the SLUK in the storage unit 208 of the communications device 104, the user may now initiate a payment process when purchasing goods or services at a store. This payment process is schematically illustrated in FIG. 7, which shows the various interactions between the user 100, the communications device 104, the POS terminal 106, a payment gateway 700, and the payment device 200. The payment gateway 700 is an information gateway which links the POS terminal 106 (located at the store at which goods or services are purchased) and payment device 200 (located at the financial institution) and which manages electronic messages transmitted between the POS terminal 106 and payment device 200. Such information gateways are known in the art, and will therefore not be described in detail here.

At steps 702 and 704, the user 100 takes the communications device 104 and presents the communications device to the POS terminal 106. As previously mentioned, in an embodiment, this involves the user holding the communications device 104 in sufficiently close proximity to the POS communications device 106 so as to allow NFC signalling to be exchanged between the communications device and POS device. The user will take and present the communications device once goods or services have been checked through the check-out system used by the store and thus when a total price which must be paid by the user (that is, the payment value) has been calculated. This payable price is determined by the POS terminal (for example, the POS terminal may receive information indicative of the payable price from the proprietary check out system used by the store). When the communications device is presented to the POS terminal, the NFC unit 202 of the communications device transmits signalling to the NFC unit 212 of the POS device indicating that the communications device wishes to initiate payment. In response to this, the NFC unit 212 of the POS device returns a datagram indicative of the price which must be paid. This occurs in step 706.

At step 708, the controller 207 determines whether the payment is a high value payment. A high value payment is a payment which exceeds a predetermined threshold value in a given currency. Payments due which exceed this threshold are deemed to be high value payments. For example, a high value payment may be a payment which is more than 30 pounds sterling (£) or 30 US dollars ($), for example (in which case the £30 or $30 represents the predetermined threshold). The determination of whether a payment is a high value payment may be used to determine whether the partial passcode needs to be entered by the user. That is, the payment process may be such that, in order to provide increased convenience for the user for low value payments (that is, payments below the predetermined threshold), the partial passcode must be entered only for high value payments in order for the transaction to be initiated. For low value payments, the partial passcode is not required for the transaction to be initiated. The use of the partial passcode only for high value payments occurs in the example of FIG. 7, hence the determination of whether or not the proposed payment value (as indicated in the datagram received from the POS terminal in step 706) is a high value payment (that is, whether or not the proposed payment value exceeds the predetermined high value payment threshold). In FIG. 7, the proposed payment value is determined to be a high value payment, and thus the process continues. However, in another embodiment, the partial passcode must be entered for all payment values. In this case, there is no need to determine whether or not the proposed payment value is a high value payment, and thus step 708 can be omitted from the payment process.

At step 710, the controller 207 of the communications device determines the positions in the passcode of each character of the partial passcode. This is carried out using the same method as used by the payment device 200 in determining the positions in the passcode of each character of the partial passcode, as previously described with reference to FIGS. 6A and 6B. This is possible because the token PAN, secret key associated with the communications device and variable code have been previously stored in the storage unit 208 of the communications device (see step 410 of FIG. 4 and step 510 of FIG. 5). The controller 207 is therefore able to apply the same FPE function on the token PAN, secret key and variable code as applied by the payment device 200 and to therefore obtain the same character position numbers as previously determined by the payment device (thus, to use the previously mentioned example, the controller 207 will determined the character position numbers 6, 5, 1 and 2). Note that no characters of the partial passcode are actually determined here (since the partial passcode is not stored on the communications device). Only the position of each character in the partial passcode is determined.

At step 711, the user is requested by the communications device 104 to enter the partial passcode. That is, the user is requested to enter the subset of characters of the passcode whose character position in the passcode has been determined at step 710. This is carried out via the user interface 210, which presents to the user a screen such as the partial passcode entry screen 300 shown in FIG. 3. At step 713, the user then enters the partial passcode (using the virtual keypad 306, for example), thus providing the characters of the partial passcode to the controller 207 of the communications device. In this case, the user would enter the partial passcode characters 9, 4, 8, and 3, since these relate to the $6^{th}$, $5^{th}$, $1^{st}$, and $2^{nd}$ characters of the passcode, respectively.

At step 712, the controller 207 retrieves the SLUK which was previously received from the payment device 200 and stored in the storage unit 208 (see step 510 of FIG. 5) and unwraps the SLUK using the characters of the partial passcode entered by the user. The SLUK is unwrapped using an algorithm corresponding to the PBKDF2 algorithm previously used to generate the SLUK, for example. The unwrapping of the SLUK generates a further LUK (which may be referred to as a second LUK) which should match the LUK originally generated by the payment device 200 (which may be referred to as a first LUK—see step 502 of FIG. 5) in the case that the user has entered the correct characters of the partial passcode.

At step 714, the controller 207 uses the second LUK to generate a cryptogram. The cryptogram may be generated using any suitable cryptogram generation algorithm. For example, the cryptogram generation algorithm may be defined by the payment scheme (described below) used to actually transfer funds from the user of the communications device 104 to the store at which a product or service is purchased following correct entry of the partial passcode. In a particular example, the cryptogram generation algorithm is associated with a Cardholder Verification Method (CVM) associated with the used payment scheme. Such algorithms include may include, for example, CVM10, CVM14, CVM17, or CVM15. Furthermore, at step 716, a Cryptographic Key Check Value (KCV) is generated. The use of the KCV allows the payment device 200 to determine whether a mismatch between the first and second LUKs has been caused by a user entering the partial passcode incorrectly or for another reason (for example, data corruption or tampering). The KCV is explained in detail later on. At step 718, the cryptogram, KCV and token PAN are transmitted as an electronic message (the electronic message being an electronic payment authentication request message) from the communications device 104 to the POS device 106 via the NFC units 202 and 212. Then, at step 720, the controller 218 of the POS device 106 adds a datagram indicative of the value of the payment (that is, the price which is to be paid by the user for the acquired goods or services) to the electronic message and controls the transmitter 216 to transmit the electronic message (with the datagram added) to the gateway 700. At step 722, the gateway 700 forwards the electronic message to the payment device 200 at the financial institution. The electronic message is received by the receiver 220 of the payment device 200.

Once the electronic message has been received, at step 724, the controller 224 of the payment device retrieves the token PAN from the electronic message and uses the token PAN, together with the key associated with the financial institution and the variable code to regenerate the first LUK. It is recalled that the token PAN associated with the user of the communications device 104, the key associated with the financial institution (such as the IMK) and the variable code are exactly the same parameters used previously to generate the first LUK prior to the first LUK being wrapped (to generate the SLUK) and transmitted to the communications device 104 (see step 502 of FIG. 5). At step 726, the controller 224 then generates a cryptogram from the regenerated first LUK using the same technique as used by the communications device 104 in step 714.

At step 728, the resulting cryptogram is then compared with the cryptogram included in the electronic message received from the communications device 104. In particular, it is determined as to whether the newly generated cryptogram matches the cryptogram received from the communications device. If there is a successful match, then it is determined that the user has correctly entered the partial passcode and that there has been no tampering with the electronic message. The payment is therefore authenticated, and the payment device 200 then initiates a payment equal to the payment value from an account held by the user at the financial institution to the recipient (for example, the goods or service provider with which the POS terminal 106 is associated). The details of the recipient necessary for receiving payment are included, for example, in the datagram of the electronic message received from the communications device 104. These details depend on the payment scheme used, but may include, for example, a bank account number and sort code of the recipient. The payment is initiated by the payment device 200 using a suitable predetermined payment scheme, such as, for example, Visa®, Discover®, or Faster Payments®. It is noted that the token PAN may be associated with the user of the communications device 104 will be indicative of the payment scheme which is used. For example, the token PAN may be or may be based on a debit or credit card number associated with the account of the user held at the financial institution. A message is then transmitted to the POS device 106 and/or communications device 104 to indicate that the payment has been processed successfully.

On the other hand, if there is not a successful match, then this may be because either the user has entered the partial passcode incorrectly or because the electronic message received from the communications device has been corrupted or tampered with. It is important to know which of these is the case. If the user has entered the partial passcode incorrectly, then the user may be provided with one or more additional opportunities to enter the partial passcode, for example. On the other hand, if there is a risk of corruption or tampering, then this will need to be investigated. Thus, in the case that there is not a successful match, the process proceeds to step 730, in which the KCV of the message received from the communications device is analysed.

Figure 8:
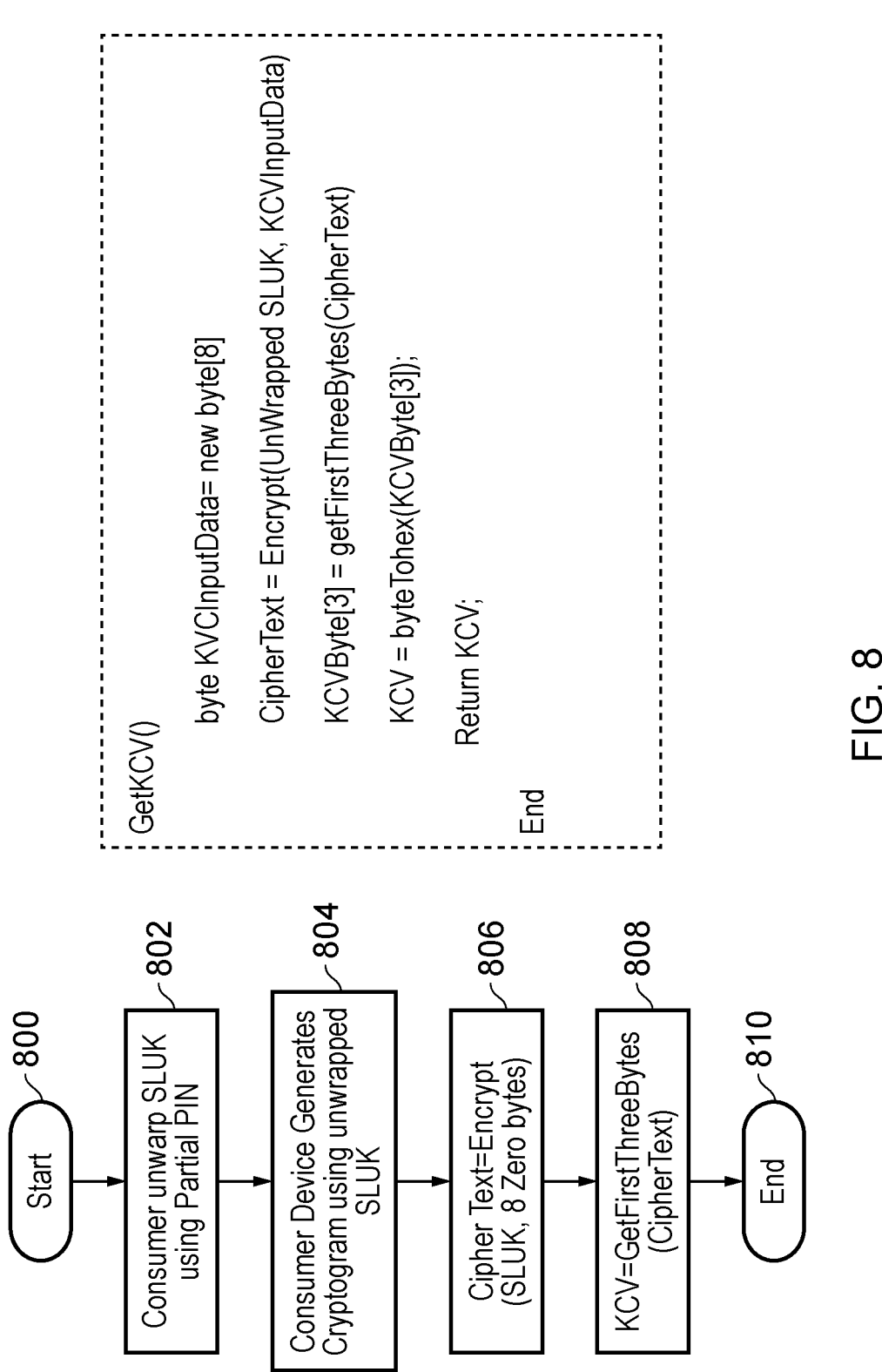
FIG. 8 schematically shows the generation of a Key Check Value (KCV), according to an embodiment of the present disclosure.

FIG. 8 schematically shows a process in which the KCV is generated by the controller 207 of the communications device 104 for the second LUK generated by unwrapping the SLUK. The process starts at step 800. At step 802, the SLUK is unwrapped to generate the second LUK and, at step 804, a cryptogram is generated using the second LUK. Thus, it is seen that steps 802 and 804 are equivalent to previously described steps 712 and 714, respectively. At step 806, an encryption function DD is performed with the second LUK (also known as the unwrapped SLUK) and eight zero bytes as inputs. The encryption function may be a symmetric key encryption function, for example. In particular, in one embodiment, if the first LUK is generated using a specific symmetric key encryption function, then a corresponding symmetric key encryption function is used at step 806 (thus, for example, if AES or DES is used for generating the first LUK, then a respective AES or DES symmetric key encryption function is used at step 806). At step 808, the first three bytes of the output of this encryption function are then determined to be the KCV. The process then ends at step 810. In an embodiment, the KCV is passed from the communications device 104 to the payment device 200 as part of an Issuer Application Data (IAD) EMV® data element. Such data elements have a size of 32 bytes, and thus 3 out of the 32 bytes are used for transmitting the KCV. A similar process as shown in FIG. 8 is applied by the controller 224 of the payment device 200 so as to generate a KCV value for the first LUK which is regenerated at step 724 in FIG. 7. In particular, the regenerated first LUK is taken as an input, together with eight zero bytes to the same encryption function used at step 806, and the first three bytes of the output of the encryption function are taken as the KCV.

At step 730, the KCV received from the communications device 104 is compared with the KCV generated by the payment device 200. If the KCVs match, then it is determined that the user correctly entered the partial passcode. In this case, the mismatch between the cryptogram received from the communications device and the cryptogram generated by the payment device is determined to be caused by tampering and/or corruption (for example) of the electronic message received from the communications device, and this may therefore be further investigated. On the other hand, if the KCVs do not match, then it is determined that the user incorrectly entered the partial passcode. In this case, it is this incorrect entry of the partial passcode which has caused the mismatch of the cryptograms, and thus, for example, the user may be provided with another chance to enter the partial passcode or may be alerted (using a telephone number and/or email address not associated with the communications device 104, for example) that an incorrect partial passcode has been entered using the communications device 104. Of course, different actions may be taken in response to each of these scenarios, depending on the preferences of the user and/or financial institution, legal requirements, etc. This KCV comparison may be implemented using a suitable Hardware Security Module (HSM) forming part of the controller 224 and may be implemented as part of an Authorization Request Cryptogram (ARQC) verification method, for example.

In embodiments, the payment device 200 transmits an updated SLUK to the communications device 104 repeatedly over time. The SLUK may be sent prior to each transaction, for example. In this case, when the user first brings the communications device 104 into sufficiently close proximity with the POS device 106 so as to initiate the payment process at each new transaction, the communications device 104 first transmits a SLUK request to the payment device 200, thus initiating the process shown in FIG. 5. Only once the communications device 104 has received the SLUK from the payment device 200 will the communications device then initiate the payment process via NFC signalling. In another example, a new SLUK may be periodically sent to the communications device 104. For example, the communications device 104 may request and receive a new SLUK once per day, hour, week, etc. It is noted that when the variable code (used for the generation of both the LUK and the partial passcode, both of which are then used to generate the SLUK) has the format DDDNN, for example, then up to 100 different codes may be sent on the same day by changing the final two numbers (which may take any of the 100 different values from 00 to 99). This allows 100 different SLUK values to potentially be produced for a given communications device 104 on any given day.

It will be appreciated that although the NFC unit, receiver and transmitter of each of the communications device and POS device 106 are shown as separate units, they together are the equivalent of a single receiver unit (which may receive signalling using a plurality of different technologies such as NFC and longer range WAN interfaces such as LTE, UMTS or Wi-Fi or wired interfaces) and a single transmitter unit (which may transmit signalling using a plurality of different technologies such as NFC and longer range WAN interfaces such as LTE, UMTS or Wi-Fi or wired interfaces). The term "longer range" here means that signals can be exchanged between two devices over greater distances than is possible with NFC.

Thus, it will be appreciated that the present disclosure provides a mobile payment arrangement with increased security and convenience for the user. In particular, security is increased due to the use of the partial passcode and due to the fact that the partial passcode is securely stored only at the payment device 200 of the financial institution. The passcode is not stored (fully or partially) on the communications device 104 and is not shared (fully or partially) with the POS terminal 106, thus helping to keep the passcode secure.

In an example embodiment, a method of operating a communications device for implementing an electronic payment process includes controlling a receiver unit of the communications device to receive a secure limited use key (SLUK) from a financial institution, wherein the SLUK is generated by the financial institution using (A) a first limited use key (LUK) generated using a first key associated with the financial institution, an identifier which identifies a user of the communications device, and a variable code, and (B) a subset of the characters of a passcode associated with the user of the communications device, wherein each character in the subset is identified by its character position in the passcode, wherein the character position in the passcode of each of the characters in the subset is determined by a predetermined algorithm on the basis of a second key associated with the user of the communications device, the identifier which identifies the user of the communications device, and the variable code, wherein the second key is a secret key, and wherein the SLUK is generated by wrapping the first LUK using each of the characters in the subset, and receive the variable code from the financial institution. The method further includes controlling a storage unit of the communications device to store the received SLUK, the variable code, the second key associated with the user of the communications device, and the identifier which identifies the user of the communications device and initiating, in response to an operation by a user, an electronic payment at a point of sale (POS) device, and generating the character position in the passcode of each character in the subset, wherein the character position in the passcode of each character in the subset is determined by the predetermined algorithm on the basis of the second key, the identifier of the user of the communications device, and the variable code, as stored in the storage unit. The method further includes controlling a user interface of the communications device to indicate to the user of the communications device the character position in the passcode of each character in the subset as generated by the controller and to receive an input from the user indicative of each character in the subset, wherein an unwrapping process is performed on the SLUK stored in the storage unit using each character indicated by the input from the user, wherein the unwrapping process generates a second LUK, and controlling a transmitter unit of the communications device to transmit the generated second LUK to the financial institution for authentication of the electronic payment. The example embodiment may also include a recording medium configured to store a computer program configured to control a computer configured to perform the method.

In another example embodiment, a method of operating a payment device for implementing an electronic payment process at a financial institution includes generating a secure limited use key (SLUK) to be transmitted to a communications device, wherein the SLUK is generated by the controller using (A) a first limited use key (LUK) generated using a first key associated with the financial institution, an identifier which identifies a user of the communications device, and a variable code, and (B) a subset of the characters of a passcode associated with the user of the communications device, wherein each character in the subset is identified by its character position in the passcode, wherein the character position in the passcode of each of the characters in the subset is determined by a predetermined algorithm on the basis of a second key associated with the user of the communications device, the identifier which identifies the user of the communications device, and the variable code, wherein the second key is a secret key, and wherein the SLUK is generated by wrapping the first LUK using each of the characters in the subset. The method further includes controlling a transmitter unit of the payment device to transmit the generated SLUK to the communications device. The method further includes controlling a receiver unit of the payment device to receive a second LUK generated by the communications device, wherein the second LUK is generated by the communications device in response to an operation by the user of the communications device to initiate an electronic payment at a point of sale (POS) device, and wherein the generation of the second LUK includes determining the character position in the passcode of each character in the subset, wherein the character position in the passcode of each character in the subset is determined by the predetermined algorithm on the basis of the second key, the identifier of the user of the communications device, and the variable code, each of which is known to the communications device, indicating to the user of the communications device the determined character position in the passcode of each character in the subset and receiving an input from the user indicative of each character in the subset, and performing an unwrapping process on the SLUK transmitted by the transmitter unit, wherein the unwrapping process generates the second LUK, wherein the received second LUK is compared with the first LUK, and wherein the electronic payment is authenticated only when the second LUK matches the first LUK. The example embodiment may also include a recording medium configured to store a computer program configured to control a computer configured to perform the method.

In another example embodiment, a method of operating a point of sale (POS) device for implementing an electronic payment process includes determining a payment value of a payment to be made by a user of a communications device. The method further includes controlling a receiver of the POS device to receive, from the communications device, a limited use key (LUK), wherein the LUK is generated by the communications device, and wherein the generation of the LUK includes determining a character position in a passcode associated with the user of the communications device of each character in a subset of characters of the passcode, wherein the character position in the passcode of each character in the subset is determined by a predetermined algorithm on the basis of a secret key associated with the communications device, an identifier of the user of the communications device, and a variable code, each of which is known to the communications device, indicating to the user of the communications device the determined character position in the passcode of each character in the subset and receiving an input from the user indicative of each character in the subset, and performing an unwrapping process on the SLUK transmitted by the transmitter, wherein the unwrapping process generates the LUK. The method further includes controlling a transmitter of the POS device to transmit the determined payment value and the LUK received from the communications device to a financial institution. The example embodiment may also include a recording medium configured to store a computer program configured to control a computer configured to perform the method.

Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry, and/or processors. However, it will be apparent that any suitable distribution of functionality between different functional units, circuitry, and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally, and logically implemented in any suitable way. Indeed the functionality may be implemented in a single unit, in a plurality of units, or as part of other functional units. As such, the disclosed embodiments may be implemented in a single unit or may be physically and functionally distributed between different units, circuitry, and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

What is claimed is:

1. A payment device associated with a financial institution, comprising:
   a receiver unit configured to receive request data from a communications device associated with a user, wherein the request data corresponds to a request for a secure limited use key (SLUK), wherein the SLUK is configured for use by the communications device for an electronic payment process with a point of sale (POS) device;
   a controller configured to:
      generate a first limited use key (LUK), in response to the received request data, based on a variable code, a user identifier associated with the user, and a financial institution key associated with the financial institution;
      determine character positions for a passcode using a predetermined algorithm based on a secret key associated with the user, the user identifier, and the variable code, wherein the passcode is associated with the user, and wherein the character positions correspond to a subset of characters of the passcode;
      determine the subset of characters of the passcode based on the determined character positions; and
      generate the SLUK based on the first LUK and the determined subset of characters of the passcode; and
   a transmitter unit configured to transmit the SLUK and the variable code to the communications device.

2. The payment device of claim 1, wherein:
   the receiver unit is further configured to receive registration request data from the communications device, wherein the registration request data corresponds to a request to register the communications device with the financial institution for use during one or more payment processes, wherein the one or more payment processes comprise the electronic payment process;
   the controller is further configured to generate the user identifier and the secret key; and
   the transmitter unit is further configured to transmit the user identifier and the secret key to the communications device.

3. The payment device of claim 1, wherein:
   the receiver unit is further configured to receive message data from the POS device, wherein the message data comprises:
      the user identifier;
      a first cryptogram generated by the communications device, wherein the first cryptogram corresponds to a second LUK generated by the communications device based on the SLUK transmitted to the communications device and a partial passcode received from the user, wherein the partial passcode corresponds to positions of the passcode determined by the communications device using the predetermined algorithm;

a first Key Check Value (KCV) generated by the communications device based on the second LUK; and
      a datagram generated by the POS device, wherein the datagram indicates a payment value associated with the electronic payment process; and
   the controller is further configured to:
      regenerate the first LUK based on the user identifier, the financial institution key, and the variable code;
      generate a second cryptogram based on the regenerated first LUK; and
      compare the first cryptogram and the second cryptogram.

4. The payment device of claim 3, wherein:
   the controller is further configured to:
      determine that the first cryptogram and the second cryptogram match based on the comparison of the first cryptogram and the second cryptogram;
      facilitate a payment between an account associated with the user and an account associated with the POS device, wherein the payment corresponds to the payment value indicated by the datagram; and
   the transmitter unit is further configured to transmit confirmation data to the communications device, the POS device, or both, wherein the confirmation data indicates the electronic payment process has been successfully completed.

5. The payment device of claim 3, wherein the controller is further configured to:
   determine that the first cryptogram and the second cryptogram do not match based on the comparison of the first cryptogram and the second cryptogram;
   generate a second KCV based on the regenerated first LUK; and
   compare the first KCV and the second KCV.

6. The payment device of claim 5, wherein the controller is further configured to:
   determine that the first KCV and the second KCV match based on the comparison of the first KCV and the second KCV; and
   determine that the partial passcode received from the user is correct.

7. The payment device of claim 5, wherein the controller is further configured to:
   determine that the first KCV and the second KCV do not match based on the comparison of the first KCV and the second KCV; and
   determine that the partial passcode received from the user is incorrect.

8. The payment device of claim 1, wherein:
   the user identifier comprises a token primary account number (PAN);
   the financial institution key comprises an Issue Master Key (IMK);
   the secret key comprises an Advanced Standards Encryption (AES) 128 bit secret key; or
   combinations thereof.

9. The payment device of claim 1, wherein generate the first LUK comprises:
   retrieve the financial institution key from a storage unit; and
   determine the variable code, wherein the variable code corresponds to a format DDDNN, wherein DDD represents a number of days since a predetermined first day of a year and NN is a key sequence number ranging from 00 to 99.

10. The payment device of claim 1, wherein the controller configured to determine the character positions for the passcode using the predetermined algorithm is further configured to:

generate a cryptographic random number (CRN) based on the secret key, the user identifier, and the variable code;

determine whether a number of characters of the CRN is greater than or equal to a number of characters of the passcode;

if the number of characters of the CRN is greater than or equal to the number of characters of the passcode, determine whether a number of unique characters of the CRN is greater than or equal to a predetermined number; and if the number of unique characters of the CRN is greater than or equal to the predetermined number, determine the character positions for the passcode based on the unique characters of the CRN.

11. The payment device of claim 10, wherein the controller configured to determine the character positions for the passcode based on the unique characters of the CRN is further configured to:

identify a set of the unique characters of the CRN, wherein a number of the unique characters included in the set is equal to the predetermined number;

determine values for the unique characters included in the set; and determine the character positions for the passcode based on the values for the unique characters included in the set, wherein a respective character position for the passcode corresponds to a value for a respective unique character included in the set.

12. The payment device of claim 10, wherein, if the number of characters of the CRN is less than the number of characters of the passcode, the controller is further configured to:

generate a second CRN based on the secret key, the user identifier, and the variable code;

determine whether a number of characters of the second CRN is greater than or equal to a number of characters of the passcode;

if the number of characters of the second CRN is greater than or equal to the number of characters of the passcode, determine whether a number of unique characters of the second CRN is greater than or equal to the predetermined number; and if the number of unique characters of the second CRN is greater than or equal to the predetermined number, determine the character positions for the passcode based on the unique characters of the second CRN.

13. The payment device of claim 10, wherein:

each unique character has a value that is less than or equal to the number of characters of the passcode;

the predetermined number is equal to a number of characters to be included in the subset of characters of the passcode; and if the number of unique characters of the CRN is less than the predetermined number, the controller is further configured to:

generate a second CRN based on the secret key, the user identifier, and the variable code;

determine whether a number of characters of the second CRN is greater than or equal to a number of characters of the passcode;

if the number of characters of the second CRN is greater than or equal to the number of characters of the passcode, determine whether a number of unique characters of the second CRN is greater than or equal to the predetermined number; and if the number of unique characters of the second CRN is greater than or equal to the predetermined number, determine the character positions for the passcode based on the unique characters of the second CRN.

14. The payment device of claim 10, wherein the controller configured to generate the CRN is further configured to provide the secret key, the user identifier, and the variable code as inputs to a Format Preserving Encryption (FPE) function.

15. The payment device of claim 1, wherein the controller configured to determine the subset of characters of the passcode is further configured to:

retrieve the subset of characters of the passcode from a storage unit of the payment device based on the determined character positions, wherein each character of the subset of characters of the passcode corresponds to a respective determined character position for the passcode.

16. The payment device of claim 1, wherein the controller configured to generate the SLUK is further configured to perform an encryption algorithm to wrap the first LUK using the determined subset of characters of the passcode.

17. A method, comprising:

receiving, at a payment device associated with a financial institution, request data from a communications device associated with a user, wherein the request data corresponds to a request for a secure limited use key (SLUK), wherein the SLUK is configured for use by the communications device for an electronic payment process with a point of sale (POS) device;

generating, at the payment device, a first limited use key (LUK), in response to the received request data, based on a variable code, a user identifier associated with the user, and a financial institution key associated with the financial institution;

determining, at the payment device, character positions for a passcode using a predetermined algorithm based on a secret key associated with the user, the user identifier, and the variable code, wherein the passcode is associated with the user, and wherein the character positions correspond to a subset of characters of the passcode;

determining, at the payment device, the subset of characters of the passcode based on the determined character positions;

generating, at the payment device, the SLUK based on the first LUK and the determined subset of characters of the passcode; and transmitting, from the payment device, the SLUK and the variable code to the communications device.

18. The method of claim 17, wherein determining, at the payment device, the character positions for the passcode using the predetermined algorithm comprises:

generating a cryptographic random number (CRN) based on the secret key, the user identifier, and the variable code;

determining whether a number of characters of the CRN is greater than or equal to a number of characters of the passcode;

if the number of characters of the CRN is greater than or equal to the number of characters of the passcode, determining whether a number of unique characters of the CRN is greater than or equal to a predetermined number; and if the number of unique characters of the CRN is greater than or equal to the predetermined number, determining the character positions for the passcode based on the unique characters of the CRN.

\* \* \* \* \*